(12) United States Patent
Park (10) Patent No.: US 7,916,361 B2
(45) Date of Patent: Mar. 29, 2011

(54) DOUBLE SIDE IMAGE SCANNER

(75) Inventor: Jong-han Park, Seoul (KR)

(73) Assignee: Wisecube Co., Ltd., Seoul (KR)

( * ) Notice: Subject to any disclaimer, the term of this patent is extended or adjusted under 35 U.S.C. 154(b) by 510 days.

(21) Appl. No.: 12/113,805

(22) Filed: May 1, 2008

(65) Prior Publication Data

US 2008/0278777 A1 Nov. 13, 2008

(30) Foreign Application Priority Data

May 8, 2007 (KR) .......................... 10-2007-0044639

(51) Int. Cl.
*H04N 1/04* (2006.01)
*H04N 1/00* (2006.01)
(52) U.S. Cl. ......... 358/498; 358/474; 358/496; 358/408
(58) Field of Classification Search .................. 358/1.1, 358/401, 408, 449, 474, 486, 488, 497, 498
See application file for complete search history.

(56) References Cited

U.S. PATENT DOCUMENTS

7,149,012 B2 12/2006 Fang et al.
2006/0256391 A1 11/2006 Eom et al.

*Primary Examiner* — Thierry L Pham
(74) *Attorney, Agent, or Firm* — Lowe Hauptman Ham & Berner LLP (57) ABSTRACT

A double side image scanner includes a frame, a two-way roll feeder, a one-way roll feeder and an image sensor. The frame includes a track that has an entrance, a scanning line joined to the entrance and a circuit line joined to the scanning line. The circuit line is designed to return the medium to the scanning line. The circuit line has a junction point where the circuit line meets with the scanning line, an inlet through which the medium comes into the circuit line from the scanning line and an outlet through which the medium goes out of the circuit line toward the scanning line. A driving means mounted to the frame for driving the two-way roll feeder and the one-way roll feeder. The image sensor obtains image data by scanning the front and rear surfaces of the medium.

8 Claims, 12 Drawing Sheets

DOUBLE SIDE IMAGE SCANNER

RELATED APPLICATIONS

The present application is based on, and claims priority from, Korea Application Number 10-2007-0044639, filed May 8, 2007, the disclosure of which is hereby incorporated by reference herein in its entirety.

FIELD OF THE INVENTION

The present invention relates to a double side image scanner. More particularly, the present invention relates to a double side image scanner capable of scanning images from the both surfaces of a medium by use of a single image sensor.

BACKGROUND OF THE INVENTION

An image scanner refers to an image input device that optically scans various media, such as documents, drawings, photos, films, checks, securities and the like, and converts analog signals indicative of the intensity of reflected or transmitted light to digital signals to thereby input digital images. Generally, the image scanner is interfaced with a computer for processing image data.

U.S. Pat. No. 7,149,012 discloses an image scanner designed to scan the surfaces of a medium placed on a window glass by moving an image sensor, e.g., a charge-coupled device (CCD) or an amorphous semiconductor, across the medium. With this image scanner, however, a user has to turn up the medium and reload it on the window glass with the opposite side in order to scan the other surface of the medium. This task is quite onerous and time-consuming.

U.S. Patent Publication No. 2006/0256391A1 discloses a double side image scanner that scans both surfaces of a medium while causing a roll feeder to load the medium toward two image sensors mounted to the lateral sides of a guide track. Provision of the two image sensors on the lateral sides of the guide track leads to a complicated structure and a difficult fabrication process, which in turn reduces productivity and increases production costs.

SUMMARY OF THE INVENTION

In view of the above-mentioned and other problems inherent in the prior art, it is an object of the present invention to provide a double side image scanner capable of obtaining images from front and rear surfaces of a medium by use of a single image scanner.

Another object of the present invention is to provide a double side image scanner that can increase productivity and can reduce production costs by use of a simple structure incorporating a single motor and a single image sensor.

With these objects in view, the present invention provides a double side image scanner comprising:

a frame having a first and second major surfaces, the frame including a track for guiding a medium having a front surface, a rear surface, a leading end and a trailing end, the track including an entrance through which the medium is loaded and unloaded, a scanning line joined to the entrance so that the medium is scanned in the scanning line and a circuit line joined to the scanning line, the circuit line designed to return the medium to the scanning line, the circuit line having a junction point where the circuit line meets with the scanning line, an inlet through which the medium comes into the circuit line from the scanning line and an outlet through which the medium goes out of the circuit line toward the scanning line;

at least one two-way roll feeder mounted to the first major surface of the frame for conveying the medium along the scanning line in a first medium-loading direction and in a second medium-unloading direction;

at least one one-way roll feeder mounted to the first major surface of the frame for conveying the medium along the circuit line in the first medium-loading direction;

a driving means mounted to the frame for driving the two-way roll feeder and the one-way roll feeder; and an image sensor mounted to the first surface of the frame along the scanning line for obtaining image data by scanning one of the front surface and the rear surface of the medium when the medium is loaded along the scanning line and by scanning the remaining one of the front surface and the rear surface of the medium when the medium is unloaded along the scanning line.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Hereinafter, preferred embodiments of a double side image scanner in accordance with the present invention will be described in detail with reference to the accompanying drawings.

Referring to FIGS. 1 to 4, the double side image scanner in accordance with the present invention includes a frame 10. A pair of guide walls (or fences) 12 and 14 is provided on one side of the frame 10 in a spaced-apart relationship to form a track 16 for guiding the movement of a flexible medium 2. The track 16 comprises an entrance 18, a scanning line 20 and a circuit line 22. The entrance 18 of the track 16 is positioned in one side edge of the frame 10 so that a user can load and unload the medium 2 with ease. The scanning line 20 is joined to the entrance 18 and is designed to provide a section where the medium 2 is scanned during the loading and unloading process.

The circuit line 22 is joined to the scanning line 20 to form a closed loop. The circuit line 22 has a junction point 24 where the circuit line 22 is joined to the scanning line 20 so that the medium 2 conveyed from the scanning line 20 can be returned back to the scanning line 20. Near the junction point 24, there are formed an inlet 26 through which the medium 2 comes into the circuit line 22 and an outlet 28 through which the medium 2 goes out from the circuit line 22. As can be seen in FIGS. 1 to 4, the circuit line 22 is formed into a generally rectangular shape with three curvilinear corners. This is illustrated by way of example and, therefore, the circuit line 22 may be formed into other shapes, e.g., a circular shape, an elliptical shape and a triangular shape, as long as the circuit line 22 is capable of smoothly returning the medium 2 to the scanning line 20.

The present double side image scanner includes a loading device 30 attached to one major surface of the frame 10 for conveying the medium 2 along the track 16. The loading device 30 includes first and second two-way roll feeders 32 and 34 arranged along the scanning line 20 for conveying the medium 2 in the two (forwarding and rewarding) directions of the track 16 and first to fourth one-way roll feeders 40, 42, 44 and 46 arranged along the circuit line 22 for conveying the medium 2 in one direction of the track 16.

The first two-way roll feeder 32 is arranged upstream of the scanning line 20 near the entrance 18. The second two-way roll feeder 34 is arranged downstream of the scanning line 20 near the junction point 24. The distance between the first and second two-way roll feeders 32 and 34 is kept smaller than the length of the medium 2, which means that the leading end 2a and the trailing end 2b of the medium 2 can be simultaneously pinched by the first and second two-way roll feeders 32 and 34. The first one-way roll feeder 40 is arranged upstream of the circuit line 22 near the junction point 24 and the fourth one-way roll feeder 46 is arranged downstream of the circuit line 22 near the junction point 24. The second one-way roll feeder 42 and the third one-way roll feeder 44 are arranged between the first one-way roll feeder 40 and the fourth one-way roll feeder 46. The distance between two neighboring feeders of the first to fourth one-way roll feeders 40, 42, 44 and 46, e.g., the distance between the first one-way roll feeder 40 and the second one-way roll feeder 42, is kept smaller than the length of the medium 2. Each of the first and second two-way roll feeders 32 and 34 and the first to fourth one-way roll feeders 40, 42, 44 and 46 includes a feed roller 32a, 34a, 40a, 42a, 44a or 46a, and an idle roller 32b, 34b, 40b, 42b, 44b or 46b, both of which cooperate with each other to convey the medium 2 through frictional rolling contact with the latter. The first and second two-way roll feeders 32 and 34 and the first to fourth one-way roll feeders 40, 42, 44 and 46 may be arbitrarily changed in number and position in order to assure smooth conveyance of the medium 2.

Referring to FIGS. 1 to 5, the present double side image scanner includes a driving device 50 attached to the other major surface of the frame 10 for simultaneously rotating the feed rollers 32a and 34a of the first and second two-way roll feeders 32 and 34 and the feed rollers 40a, 42a, 44a and 46a of the first to fourth one-way roll feeders 40, 42, 44 and 46. The driving device 50 includes a motor 52, a first gear mechanism 60, a second gear mechanism 70 and a belt transmission mechanism 90.

Figure 3:
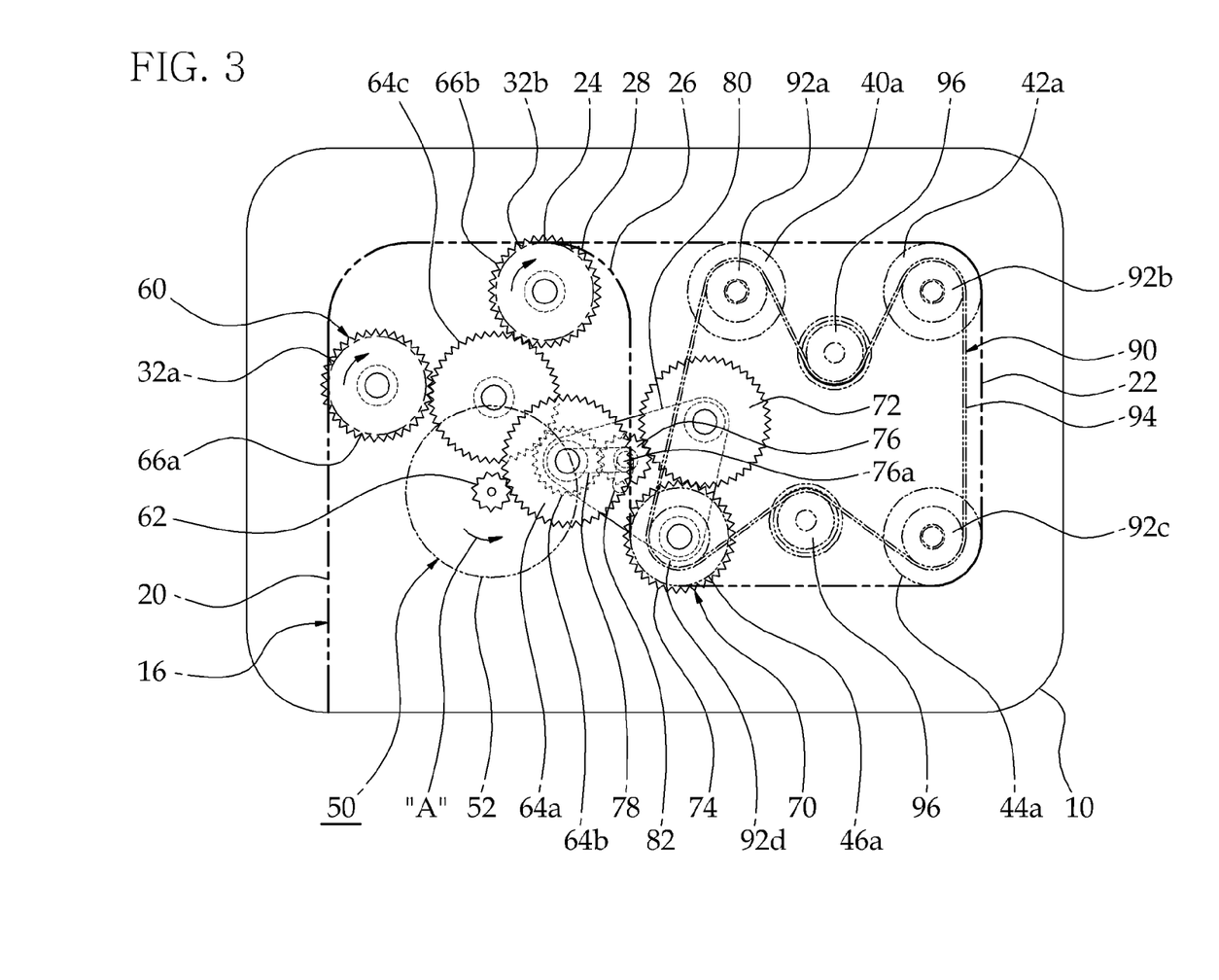
FIG. 3 is a plan view illustrating the driving device at the time of loading a medium in the present double side image scanner.
Figure 4:
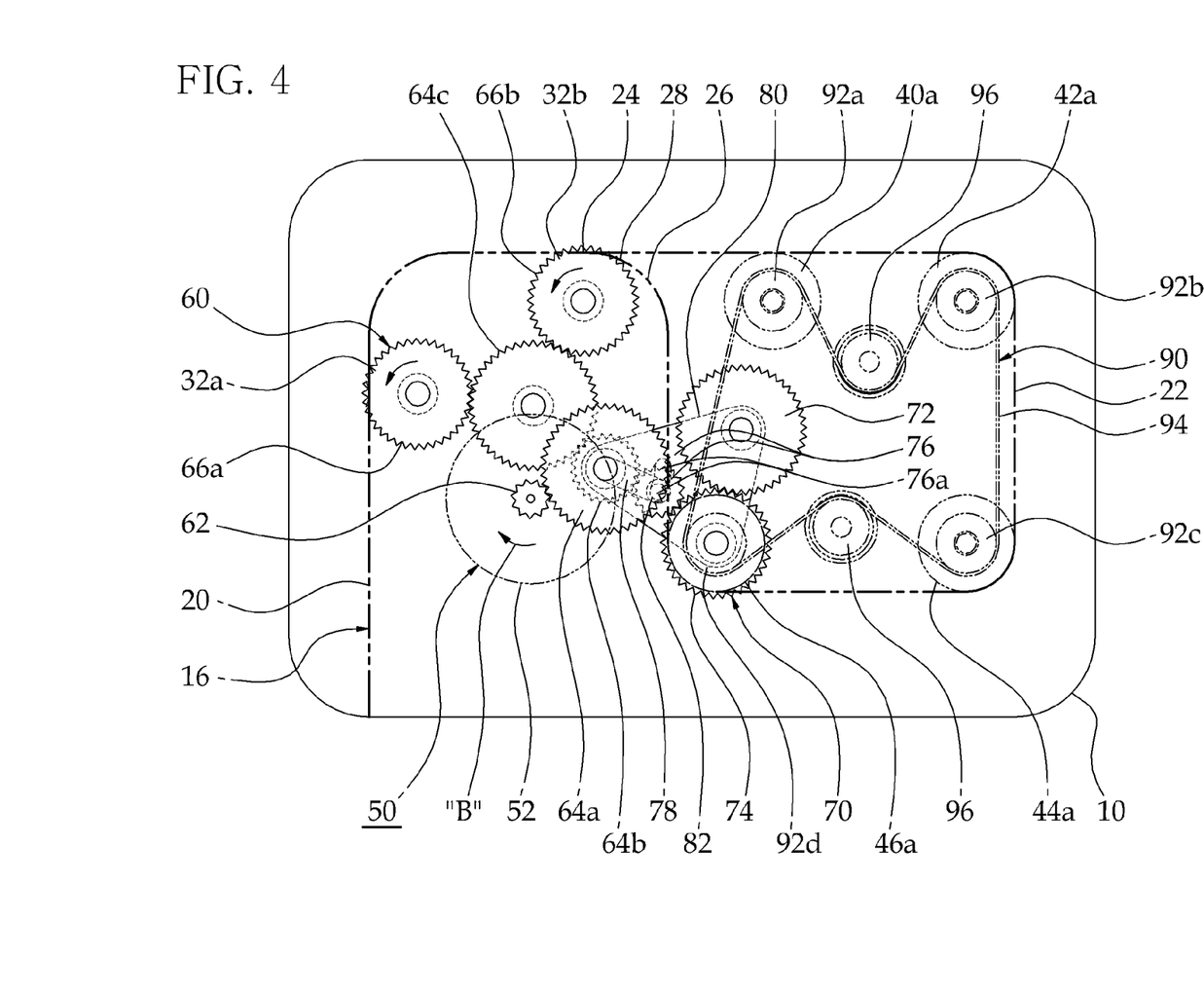
FIG. 4 is a plan view illustrating the driving device at the time of unloading the medium in the present double side image scanner.
Figure 5:
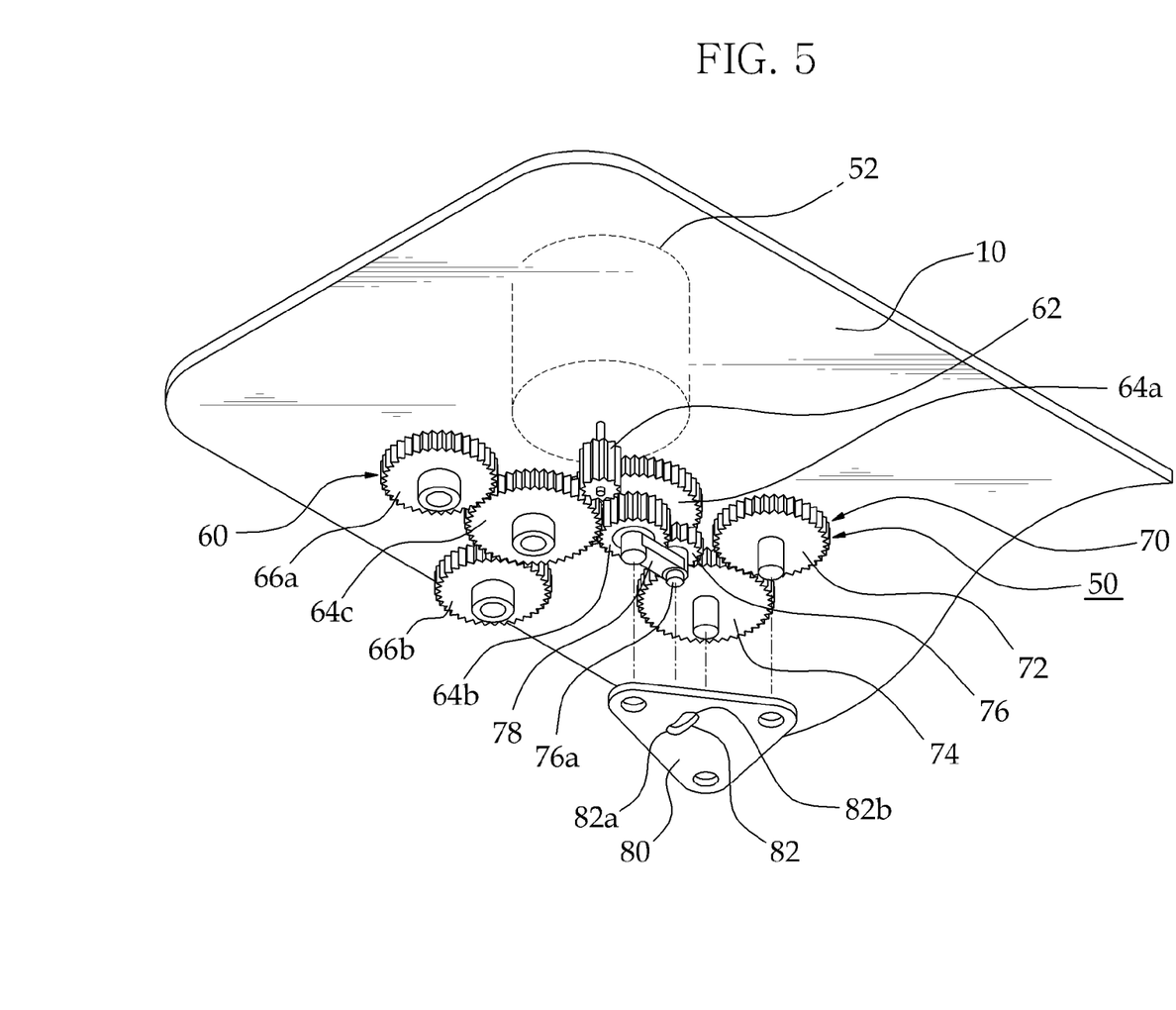
FIG. 5 is a perspective view showing the driving device employed in the present double side image scanner.

As shown in FIGS. 3 to 5, the motor 52 is attached to one major surface of the frame 10 and is designed to generate a driving power. The first gear mechanism 60 includes a driving gear 62, first to third intermediate gears 64a, 64b and 64c and first and second driven gears 66a and 66b respectively arranged on the other major surface of the frame 10 for transmitting the driving power of the motor 52 to the feed rollers 32a and 34a of the first and second two-way roll feeders 32 and 34. The feed rollers 32a and 34a of the first and second two-way roll feeders 32 and 34 are rotated in the reverse direction by the driving power of the motor 52 transmitted through the first gear mechanism 60. The driving gear 62 is operatively connected to the motor 52 so that it can be rotated by the driving power of the motor 52. The first intermediate gear 64a is attached to the frame 10 in such a manner that it can be rotated in meshing engagement with the driving gear 62. The second intermediate gear 64b is operatively connected to the first intermediate gear 64a for unitary rotation therewith. The third intermediate gear 64c is attached to the frame 10 in such a manner that it can be rotated in meshing engagement with the second intermediate gear 64b. The first driven gear 66a is rotated in meshing engagement with the third intermediate gear 64c and is connected to the feed roller 32a of the first two-way roll feeder 32. The second driven gear 66b is rotated in meshing engagement with the third intermediate gear 64c and is connected to the feed roller 34a of the second two-way roll feeder 34.

The second gear mechanism 70 serves to operatively connect the first gear mechanism 60 to one of the feed rollers 40a, 42a, 44a and 46a of the first to fourth one-way roll feeders 40, 42, 44 and 46, e.g., the feed roller 46a of the fourth one-way roll feeder 46, so that the feed rollers 32a and 34a of the first and second two-way roll feeders 32 and 34 can be rotated together (or interlinked) with the feed roller 46a of the fourth one-way roll feeder 46. The second gear mechanism 70 includes an intermediate gear 72, a driven gear 74, a clutch gear 76 and a clutch lever 78.

The intermediate gear 72 is rotatably attached to the other major surface of the frame 10. The driven gear 74 is rotated in meshing engagement with the intermediate gear 72 and is connected to the feed roller 46a of the fourth one-way roll feeder 46. The clutch gear 76 is mounted to rotate in meshing engagement with the second intermediate gear 64b of the first gear mechanism 60 and is allowed to make planetary movement around the second intermediate gear 64b so that it can engage with one of the intermediate gear 72 and the driven gear 74. Alternatively, the clutch gear 76 may be configured to engage with the first intermediate gear 64a in place of the second intermediate gear 64b so that it can transmit the torque of the first intermediate gear 64a to one of the intermediate gear 72 and the driven gear 74. The clutch lever 78 interconnects the second intermediate gear 64b and the clutch gear 76 to restrain the position of the clutch gear 76 relative to the second intermediate gear 64b.

The second gear mechanism 70 includes a restraint member (or stopper) 80 that restrains the extent of planetary movement of the clutch gear 76 around the second intermediate gear 64b. The restraint member 80 is arranged on the other major surface of frame 10. The restraint member 80 is provided with an arcuate slot 82 having a first end surface 82a and a second end surface 82b. The clutch gear 76 has shaft 76a movably inserted into the slot 82 of the restraint member 80. If the shaft 76a of the clutch gear 76 makes contact with the first end surface 82a of the slot 82, the clutch gear 76 engages with the second intermediate gear 64b and the driven gear 74, whereby the clutch gear 76 is released from the engagement with the intermediate gear 72. If the shaft 76a of the clutch gear 76 makes contact with the second end surface 82b of the slot 82, the clutch gear 76 engages with the second intermediate gear 64b and the intermediate gear 72, whereby the clutch gear 76 is released from the engagement with the driven gear 74.

Figure 2:
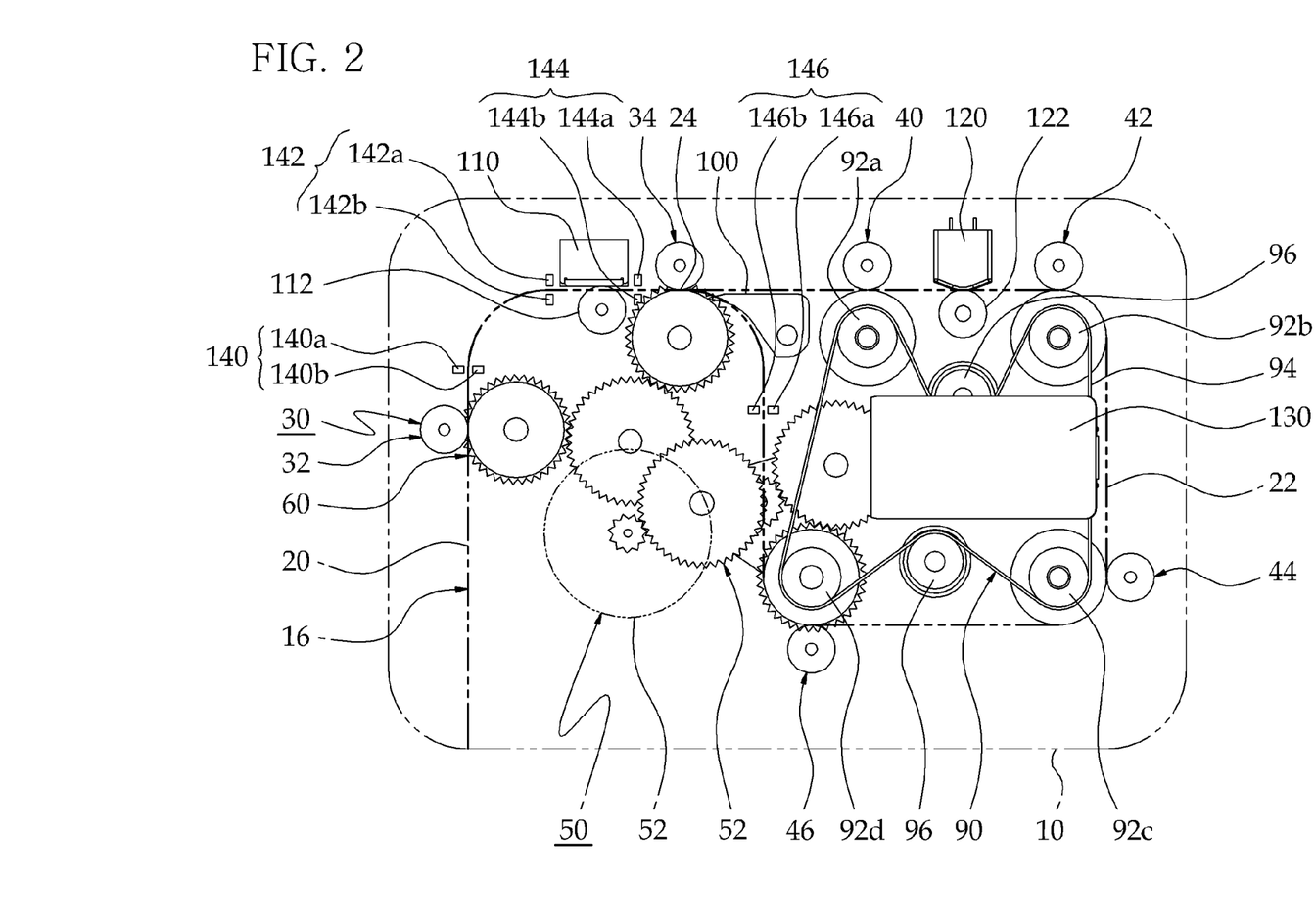
FIG. 2 is a plan view schematically showing a track, a loading device, a driving device, an image sensor, a magnetic ink character reader and a printer employed in the present double side image scanner.

The belt transmission mechanism 90 is mounted to one major surface of the frame 10. The belt transmission mechanism 90 includes first to fourth pulleys 92a, 92b, 92c and 92d connected to the feed rollers 40a, 42a, 44a and 46a of the first to fourth one-way roll feeders 40, 42, 44 and 46 and a belt 94 wound around the first to fourth pulleys 92a, 92b, 92c and 92d. The belt transmission mechanism 90 further includes a plurality of idle rollers 96 attached to one major surface of the frame 10 for guiding the movement of the belt 94 smoothly. As shown in FIGS. 2 to 4, the idle rollers 96 are arranged between the first and second pulleys 92a and 92b and between the third and fourth pulleys 92c and 92d. If necessary, the idle rollers 96 may be arbitrarily changed in number and position. The first to fourth pulleys 92a, 92b, 92c and 92d and the belt 94 of the belt transmission mechanism 90 may be respectively formed of timing pulleys and a timing belt. The belt transmission mechanism 90 may be mounted to the other major surface of the frame 10.

Figure 1:
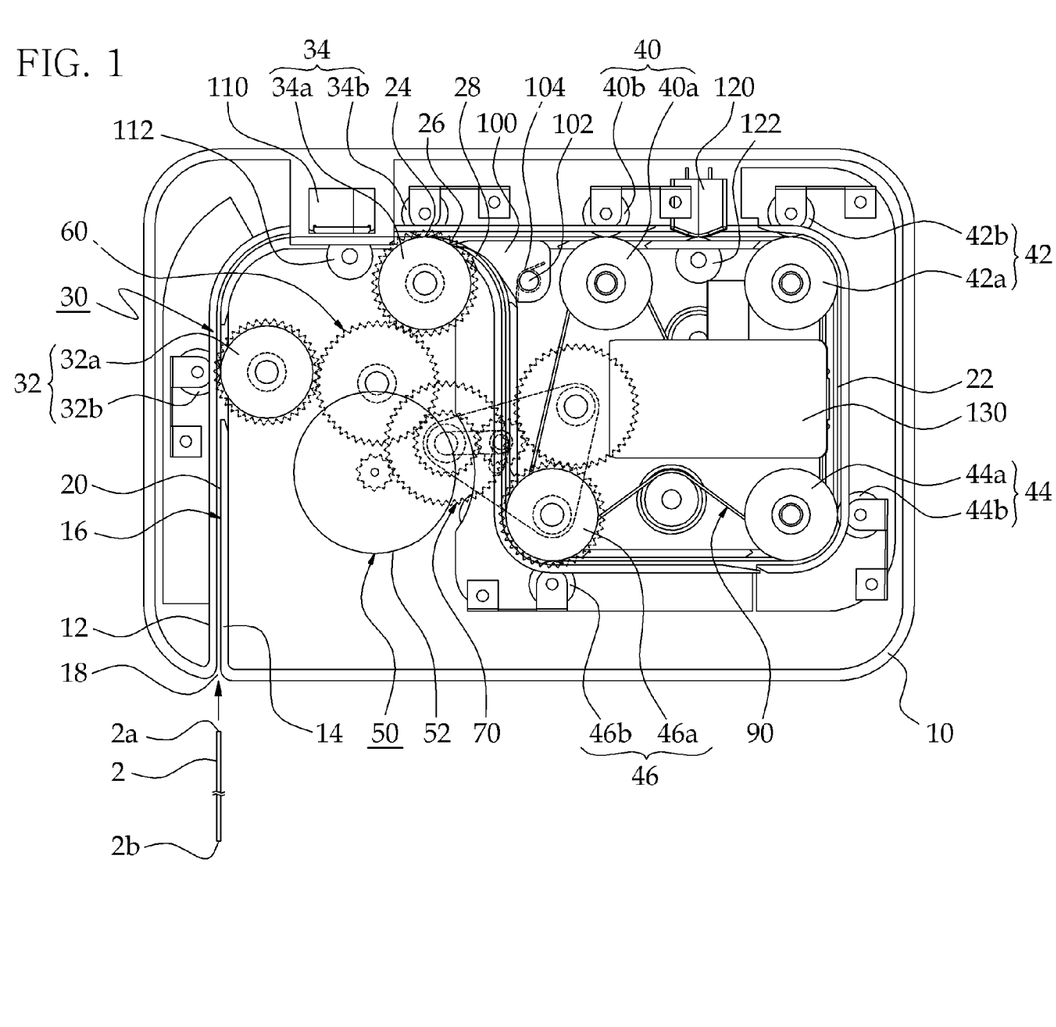
FIG. 1 is a plan view showing a double side image scanner in accordance with the present invention.

Referring again to FIGS. 1 to 4, the present double side image scanner includes a diverter 100 mounted to one major surface of the frame 10 for guiding the medium 2 from the scanning line 20 to the inlet 26 of the circuit line 22 and also for guiding the medium 2 from the outlet 28 of the circuit line 22 to the scanning line 20. As shown in FIGS. 7 to 10, the diverter 100 is mounted for rotation about a pivot shaft 102 fixed to the frame 10 between a first position P1 in which the diverter 100 opens the inlet 26 of the circuit line 22 but closes the outlet 28 thereof and a second position P2 in which the diverter 100 opens the outlet 28 but closes the inlet 26. As can be seen in FIG. 1, the diverter 100 is biased toward the first position P1 by the resilient force of a spring 104. The spring 104 is held on the pivot shaft 102 and may comprise a torsion spring whose both ends are fixed to the frame 10 and the diverter 100, respectively.

The present double side image scanner includes an image sensor 110 mounted to one major surface of the frame 10 for scanning images of the medium 2 conveyed along the scanning line 20 to obtain image data. Although the image sensor 110 is arranged near the guide wall (or fence) 12 in the embodiment shown in FIGS. 1 to 4, it may be possible to arrange the image sensor 110 near the guide wall 14. An idle roller 112 is rotatably attached to one major surface of the frame 10 in a facing relationship with the image sensor 110. The idle roller 112 serves to press the medium 2 against the image sensor 110. The idle roller 112 may be comprised of a feed roller driven by the driving power of the motor 52 transmitted through the first gear mechanism 60. In this case, the second two-way roll feeder 34 may be eliminated.

The present double side image scanner includes a magnetic ink character reader (MICR) 120 mounted to one major surface of the frame 10. The magnetic ink character reader 120 is arranged near the guide wall 12 along with the circuit line 22 to read out the magnetic ink character recognition recorded on the medium 2. Examples of the medium 2 include a check issued by financial institutions. On the front surface of the check, there are recorded an amount of money, a place of payment, a place of issuance, an issuance number, an issuance date and the like. Such information is recorded as magnetic ink character recognition in the lower margin of the front surface of the check according to the provisions of International Standard. On the rear surface of the check, there is provided a signature blank endorsable by a check holder. In the event that optical character recognition is recorded on the front surface of the check in place of the magnetic ink character recognition, the magnetic ink character reader 120 needs to be replaced by an optical character reader (OCR). An idle roller 122 is rotatably attached to one major surface of the frame 10 in a facing relationship with the magnetic ink character reader 120 so that it can press the medium 2 against the magnetic ink character reader 120.

The present double side image scanner includes a printer 130 mounted to one major surface of the frame 10. The printer 130 is arranged near the guide wall 14 in the circuit line 22 to print data on the rear surface of the medium 2 conveyed along the track 16. The printer 130 may be comprised of an inkjet printer or a dot printer.

Figure 6:
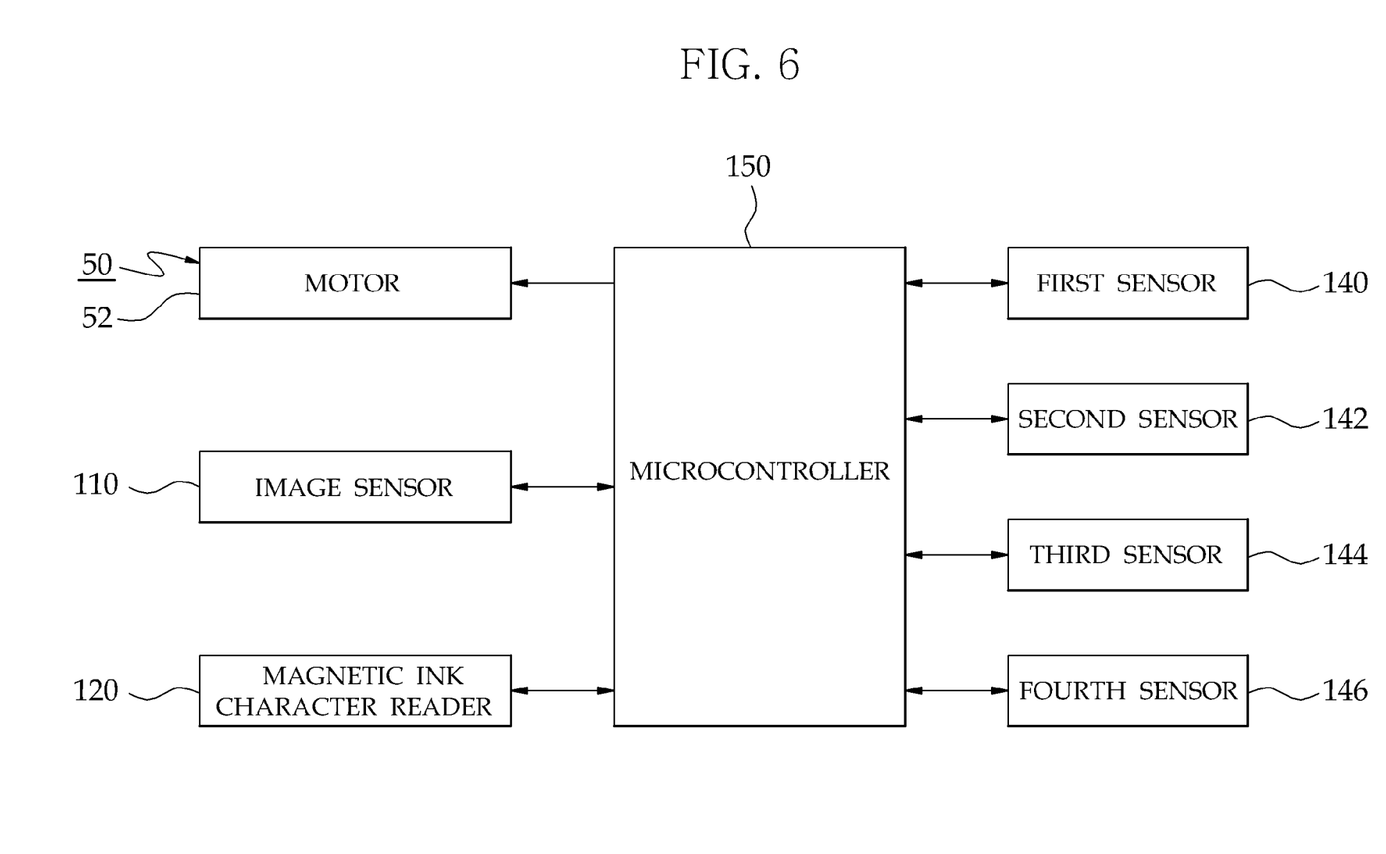
FIG. 6 is a block diagram illustrating a configuration of the present double side image scanner.

Referring to FIGS. 1 and 6, the present double side image scanner includes a control means for controlling the motor 52, the image sensor 110, the magnetic ink character reader 120 and the printer 130. The control means includes first to fourth sensors 140, 142, 144 and 146 and a microcontroller 150. The first to fourth sensors 140, 142, 144 and 146 are designed to detect the medium 2 conveyed along the track 16 and are respectively comprised of light-emitting elements 140a, 142a, 144a and 146a for emitting light toward the medium 2 and light-receiving elements 140b, 142b, 144b and 146b for receiving the light to generate electric signals.

The first sensor 140 is arranged downstream of the first two-way roll feeder 32 to detect the leading end 2a of the medium 2 passing between the feed roller 32a and the idle roller 32b of the first two-way roll feeder 32. The second sensor 142 is arranged upstream of the image sensor 110 to detect the leading end 2a of the medium 2 which is loaded and moved toward the image sensor 110. The third sensor 144 is arranged downstream of the image sensor 110 to detect the leading end 2a of the medium 2 which is unloaded and moved toward the image sensor 110. The fourth sensor 146 is arranged between the outlet 28 of the circuit line 22 and the fourth one-way roll feeder 46 to detect the leading end 2a of the medium 2.

Responsive to the signals inputted from the light-receiving elements 140b, 142b, 144b and 146b of the first to fourth sensors 140, 142, 144 and 146, the microcontroller 150 controls the motor 52, the image sensor 110, the magnetic ink character reader 120 and the printer 130. The microcontroller 150 is designed to process and store the image data inputted from the image sensor 110. The microcontroller 150 may be connected to a host computer of financial institutions through an on-line network system so that the data of the medium 2, e.g., a check or securities, can be processed by the host computer.

Description will now be made on the operation of the present double side image scanner configured as above.

Referring to FIGS. 1 to 3, 6 and 7, the medium 2, e.g., a check, is pushed into the entrance 18 and then moved along the scanning line 20, in which process the medium 2 passes between the feed roller 32a and the idle roller 32b of the first two-way roll feeder 32 and between the light-emitting element 140a and the light-receiving element 140b of the first sensor 140. If the leading end 2a of the medium 2 passes between the light-emitting element 140a and the light-receiving element 140b, the light-receiving element 140b generates an off-signal which in turn is supplied to the microcontroller 150. Responsive to the off-signal supplied from the light-receiving element 140b, the microcontroller 150 causes the motor 52 of the driving device 50 to be rotated in a forward direction, i.e., counterclockwise.

Figure 7:
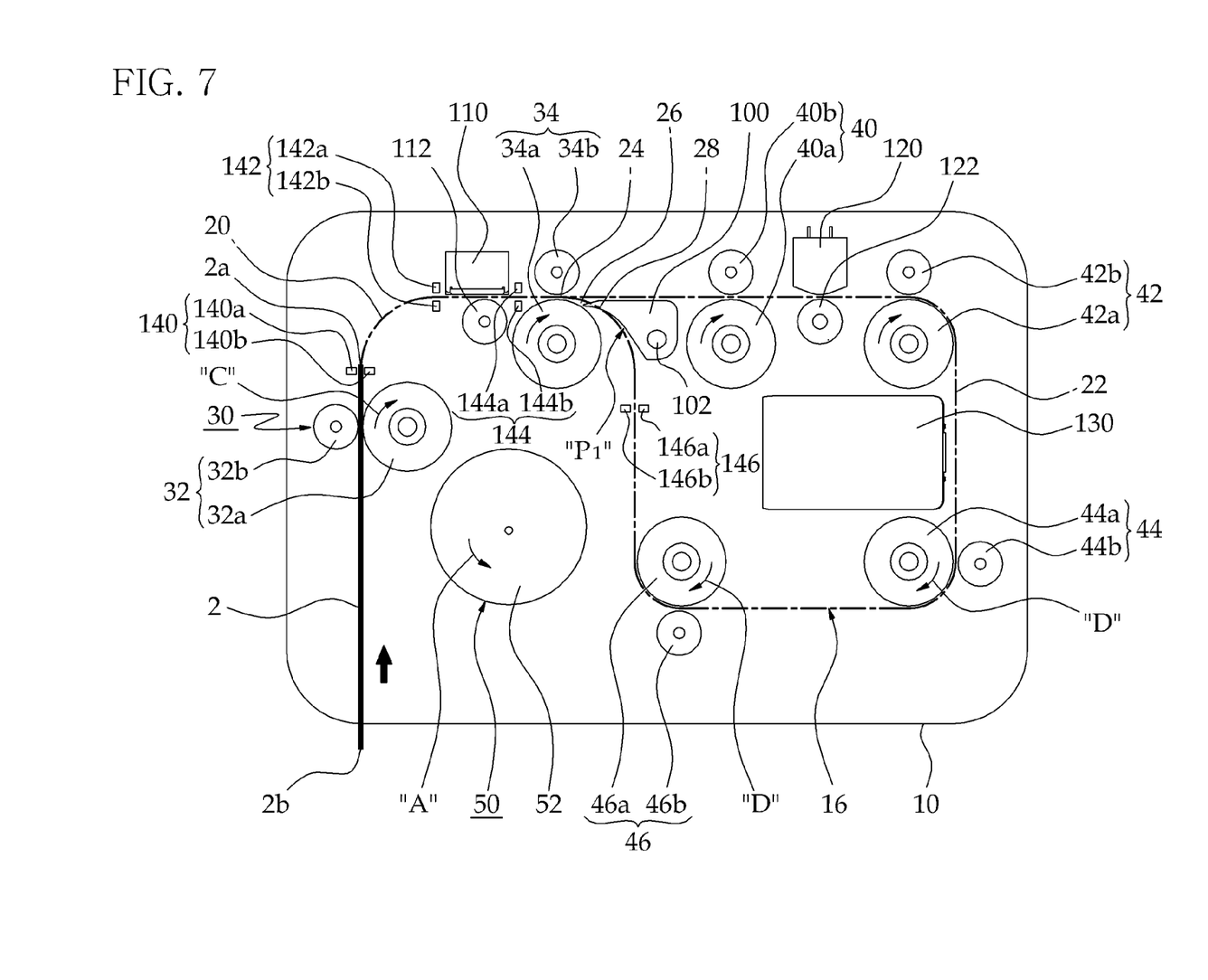
FIGS. 7 to 10 are plan views for explaining the operation of the present double side image scanner.

As indicated by an arrow "A" in FIGS. 3 and 7, the counterclockwise driving power of the motor 52 is transmitted to the feed rollers 32a and 34a of the first and second two-way roll feeders 32 and 34 through the driving gear 62, the first to third intermediate gears 64a, 64b and 64c and the first and second driven gears 66a and 66b of the first gear mechanism 60. The feed rollers 32a and 34a are rotated in the opposite direction from that of the motor 52, i.e., clockwise, as indicated by an arrow "C" in FIG. 7. The loading of the medium 2 is started by the feed roller 32a and the idle roller 32b rotating in this manner.

When loading the medium 2, the clutch gear 76 remains in meshing engagement with the second intermediate gear 64b and the driven gear 74. The driving power of the motor 52 is transmitted to the feed roller 46a of the fourth one-way roll feeder 46 through the driving gear 62 and the first and second intermediate gears 64a and 64b of the first gear mechanism 60 and then through the clutch gear 76 and the driven gear 74 of the second gear mechanism 70. At this time, the feed roller 46a is rotated clockwise as indicated by an arrow "D" in FIG. 7. The torque of the feed roller 46a is transmitted to the feed rollers 40a, 42a and 44a of the first to third one-way roll feeders 40, 42 and 44 through the first to fourth pulleys 92a, 92b, 92c and 92d and the belt 94 of the belt transmission mechanism 90, thereby rotating the feed rollers 40a, 42a and 44a clockwise.

Referring to FIGS. 1 to 3, 6 and 8, the medium 2 is conveyed along the scanning line 20 by the feed rollers 32a and 34a and the idle rollers 32b and 34b of the first and second two-way roll feeders 32 and 34. The leading end 2a of the medium 2 is detected by the second sensor 142. Responsive to the signal inputted from the second sensor 142, the microcontroller 150 operates the image sensor 110. As the medium 2 passes between the surface of the image sensor 110 and the idle roller 112, the image sensor 110 scans the front surface of the medium 2 and outputs image data which are processed by the microcontroller 150.

Figure 8:
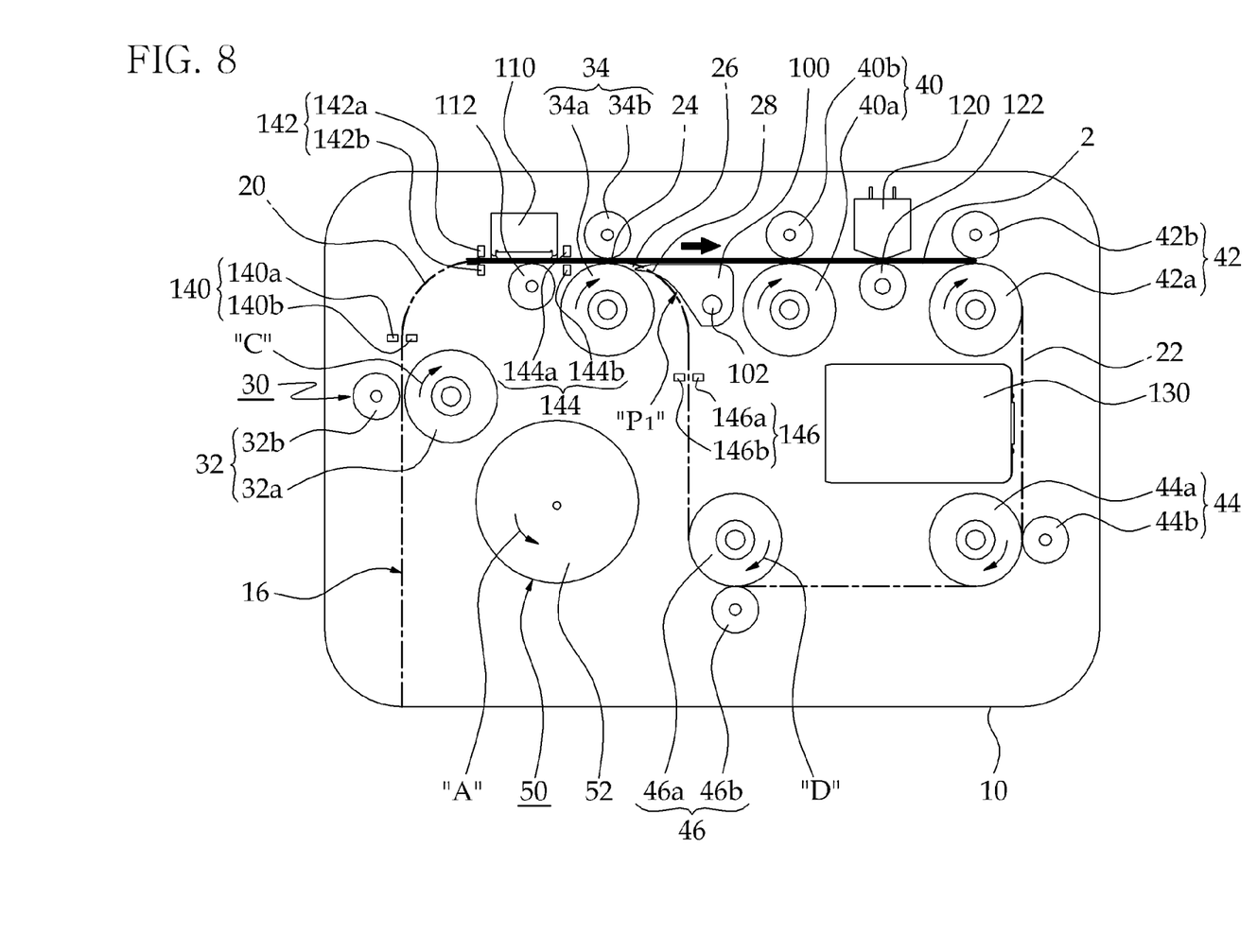
Figure 9:
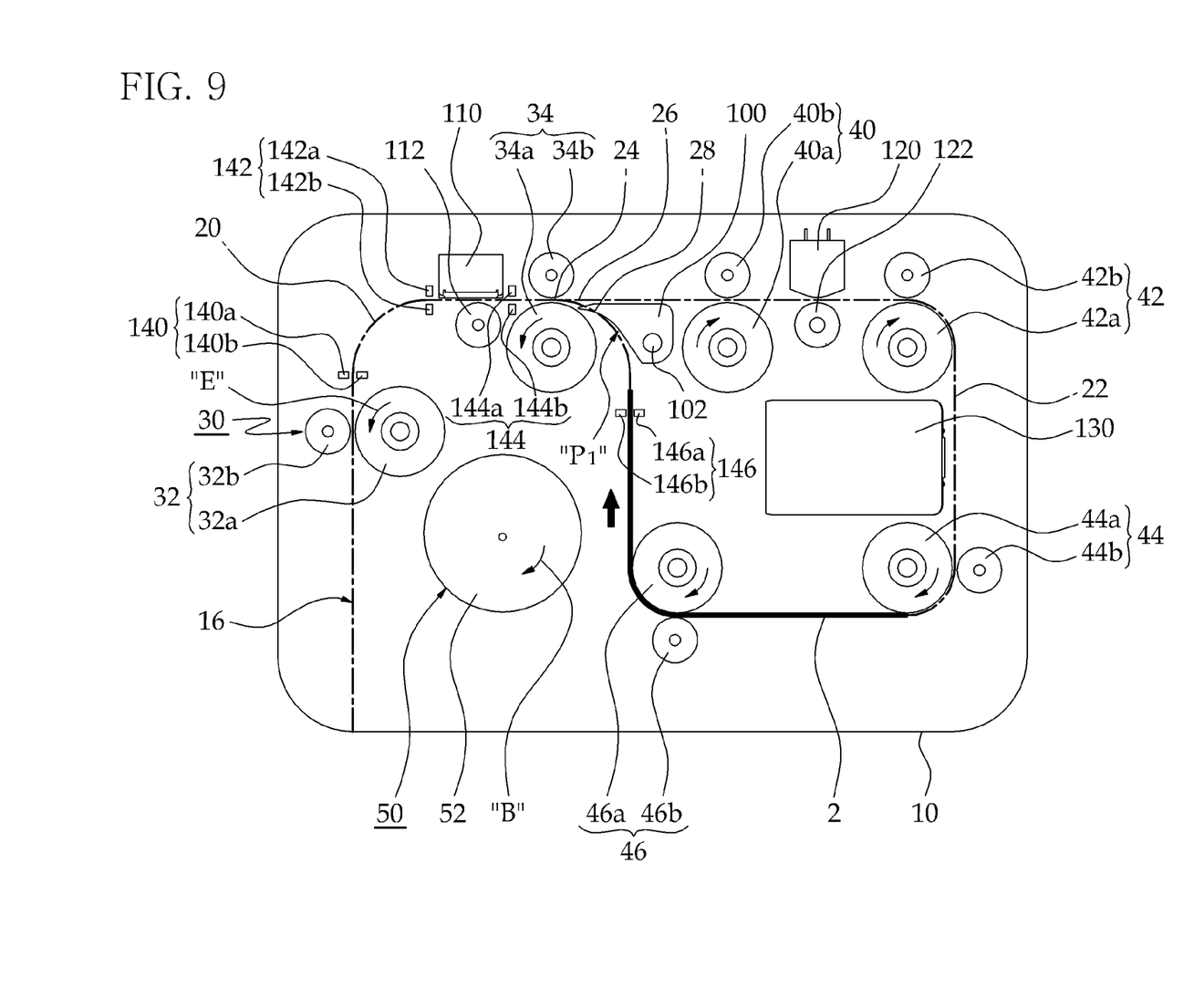

Inasmuch as the outlet 28 of the circuit line 22 is closed by the diverter 100, the leading end 2a of the medium 2 thus loaded is accurately and smoothly guided toward the inlet 26 kept in an open state. The leading end 2a of the medium 2 is transferred to the circuit line 22 through the inlet 26 and then conveyed along the circuit line 22 by the feed rollers 40a, 42a, 44a and 46a and the idle rollers 40b, 42b, 44b and 46b of the first to fourth one-way roll feeders 40, 42, 44 and 46. During movement of the medium 2 along the circuit line 22, the magnetic ink character reader 120 reads out the magnetic ink character recognition recorded on the surface of the medium 2 and outputs relevant data. The microcontroller 150 transmits the data inputted from the magnetic ink character reader 120 to a host computer of financial institutions via, e.g., an on-line network system. The host computer determines authenticity of the medium 2 by processing the data inputted from the microcontroller 150, and transmits the result to the microcontroller 150. The microcontroller 150 controls the printer 130 to print the data obtained by processing the magnetic ink character recognition on the rear surface of the medium 2.

Referring to FIGS. 1, 4, 6 and 9, the leading end 2a of the medium 2 is moved past the feed roller 46a and the idle roller 46b of the fourth one-way roll feeder 46 and is detected by the fourth sensor 146. Responsive to the signal inputted from the fourth sensor 146, the microcontroller 150 causes the motor 52 to rotate in the reverse direction. As indicated by an arrow "B" in FIGS. 4 and 9, the motor 52 is now rotated clockwise under the control of the microcontroller 150.

The clockwise driving power of the motor 52 is transmitted to the feed rollers 32a and 34a of the first and second two-way roll feeders 32 and 34 through the driving gear 62, the first to third intermediate gears 64a, 64b and 64c and the first and second driven gears 66a and 66b of the first gear mechanism 60. The feed rollers 32a and 34a are rotated counterclockwise as indicated by an arrow "E" in FIGS. 9 and 10. The first and second intermediate gears 64a and 64b of the first gear mechanism 60 are rotated counterclockwise, as a result of which the clutch gear 76 of the second gear mechanism 70 makes planetary movement around the second intermediate gear 64b. In response to the planetary movement of the clutch gear 76, the shaft 76a is moved from the first end surface 82a of the slot 82 to the second end surface 82b, whereby the planetary movement of the shaft 76a is restrained. When the shaft 76a stays in the second end surface 82b of the slot 82, the driven gear 74 disengages from the clutch gear 76 and the intermediate gear 72 comes into engagement with the clutch gear 76. The torque of the second intermediate gear 64b is transmitted to the driven gear 74 through the clutch gear 76 and the intermediate gear 72. The driven gear 74, the first to fourth pulleys 92a, 92b, 92c and 92d of the belt transmission mechanism 90 and the feed rollers 40a, 42a, 44a and 46a of the first to fourth one-way roll feeders 40, 42, 44 and 46 are rotated clockwise at all times regardless of the direction of rotation of the motor 52.

Figure 10:
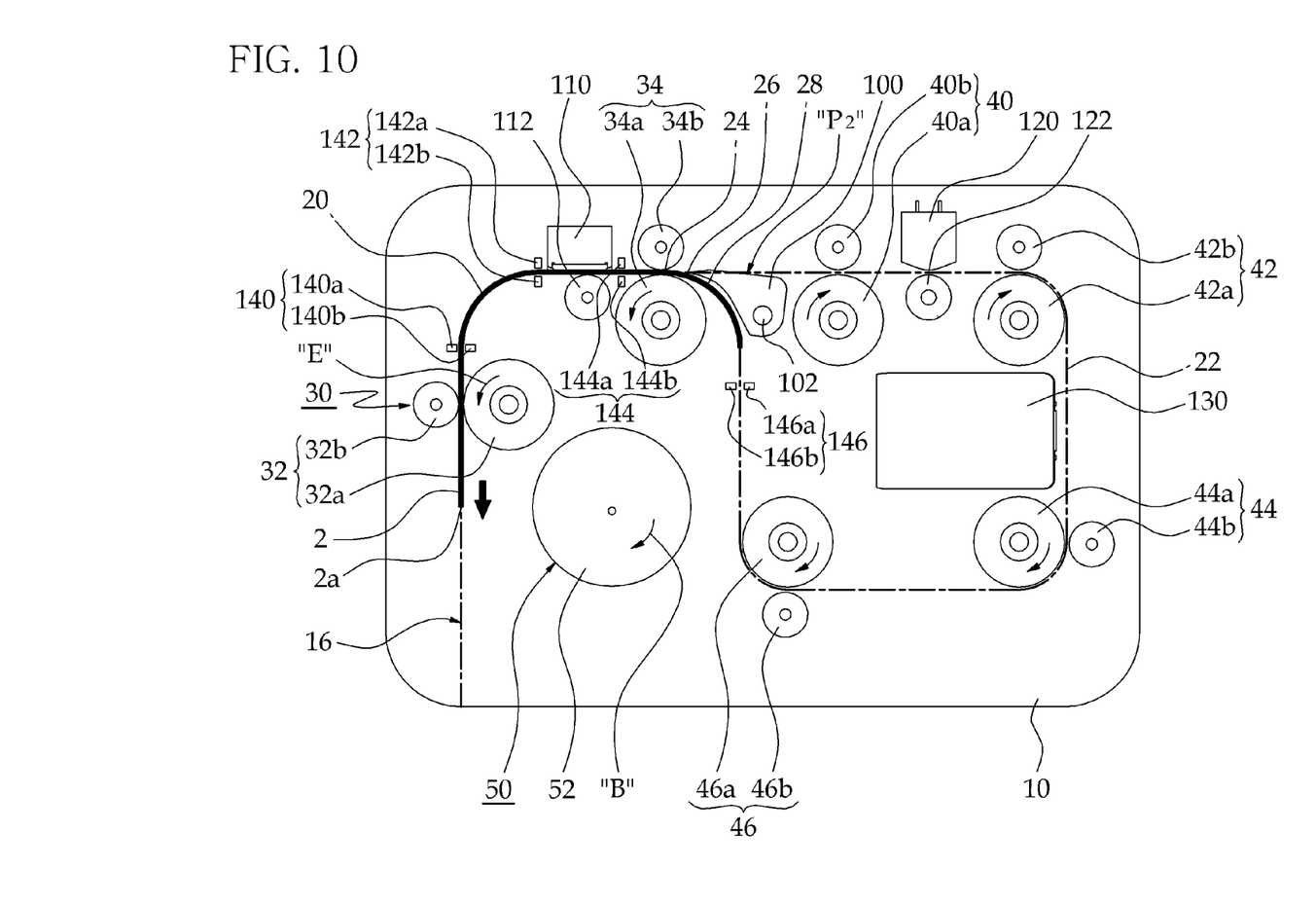

Referring to FIG. 10, the leading end 2a of the medium 2 makes contact with the diverter 100. By the moving force of the medium 2, the diverter 100 is rotated about the pivot pin 102 to open the outlet 28 and to close the inlet 26 so that the medium 2 can be guided and conveyed to the scanning line 20. The leading end 2a of the medium 2 is moved past the feed roller 34a and the idle roller 34b of the second two-way roll feeder 34 and is detected by the third sensor 144. The microcontroller 150 operates the image sensor 110 in response to the signal inputted from the third sensor 144. The medium 2 is moved between the surface of the image sensor 110 and the idle roller 112, at which time the image sensor 110 scans the rear surface of the medium 2 and outputs image data. The microcontroller 150 processes the image data inputted from the image sensor 110.

Then, the medium 2 is unloaded by sequentially moving past the image sensor 110, the second sensor 142, the first sensor 140 and then the feed roller 32a and the idle roller 32b of the first two-way roll feeder 32. At the time when the leading end 2a of the medium 2 passes the entrance 18 of the track 16, the trailing end 2b of the medium 2 is detected by the first sensor 140. The microcontroller 150 stops the motor 52 in response to the signal inputted from the first sensor 140. The leading end 2a of the medium 2 partially protruding from the entrance 18 of the track 16 is pulled by the user and completely removed from the track 16.

Figure 11:
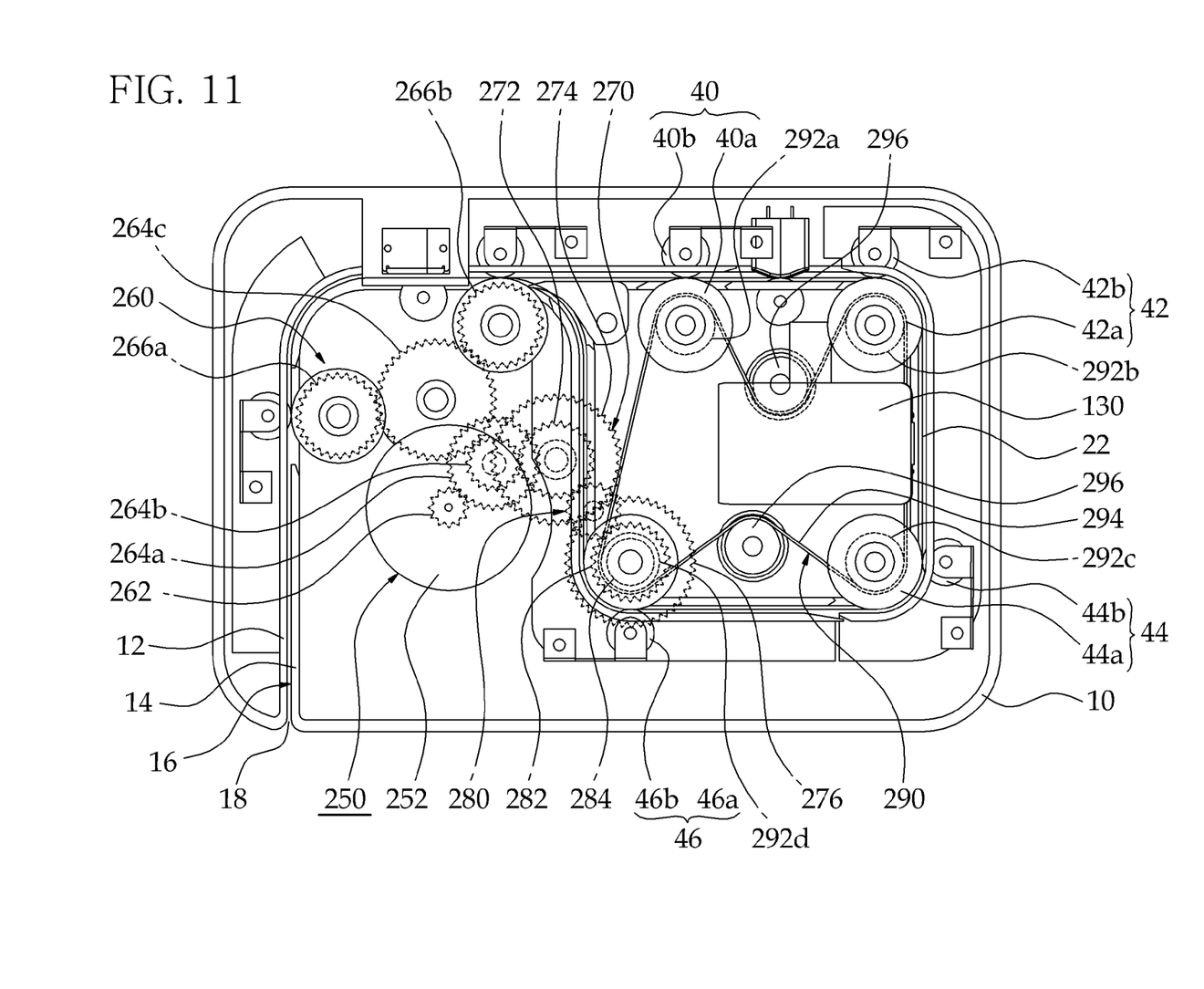
FIG. 11 is a plan view showing another example of the driving device employed in the present double side image scanner.
Figure 12:
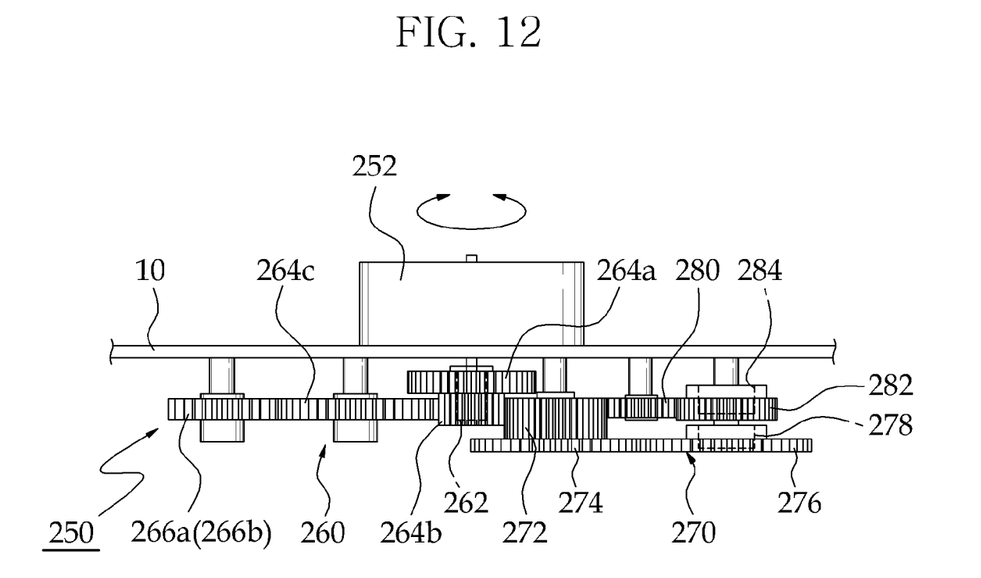
FIG. 12 is a front view showing another example of the driving device employed in the present double side image scanner.

Another example of the driving device of the present double side image scanner is shown in FIGS. 11 and 12. Referring to FIGS. 11 and 12, the driving device 250 of this example is mounted to the other major surface of the frame 10 and is designed to simultaneously rotate the feed rollers 32a and 34a of the first and second two-way roll feeders 32 and 34 and the feed rollers 40a, 42a, 44a and 46a of the first to fourth one-way roll feeders 40, 42, 44 and 46. The driving device 250 includes a motor 252, a first gear mechanism 260, a second gear mechanism 270 and a belt transmission mechanism 290.

The motor 252 and the driving gear 262, the first to third intermediate gears 264a, 264b and 264c and the first and second driven gears 266a and 266b of the first gear mechanism 260 are the same as those of the driving device 50 described earlier. The first to fourth pulleys 292a, 292b, 292c and 292d, the belt 294 and the idle rollers 296 of the belt transmission mechanism 290 are the same as those of the driving device 50 described earlier.

The second gear mechanism 70 includes a driving gear 272, a first intermediate gear 274, a first driven gear 276, a first one-way clutch bearing 278, a second intermediate gear 280, a second driven gear 282 and a second one-way clutch bearing

284. The driving gear 272 is attached to the other major surface of the frame 10 and is rotated in meshing engagement with one of the first and second intermediate gears 264a and 264b of the first gear mechanism 260, e.g., the second intermediate gear 264b. The first intermediate gear 274 is connected to the driving gear 272 for unitary rotation therewith.

The first driven gear 276 is connected to the feed roller 46a of the fourth one-way roll feeder 46 and is rotated in meshing engagement with the first intermediate gear 274. The first one-way clutch bearing 278 is fitted to the first driven gear 276 so that the torque of the first driven gear 276 can be transmitted to the feed roller 46a of the fourth one-way roll feeder 46 when the motor 52 is rotated counterclockwise. In contrast, if the motor 52 is rotated clockwise, the first one-way clutch bearing 278 prevents the torque of the first driven gear 276 from being transmitted to the feed roller 46a of the fourth one-way roll feeder 46. As a result, the first driven gear 276 comes into an idling state. The second intermediate gear 280 is attached to the other major surface of the frame 10 and is rotated in meshing engagement with the driving gear 272. The second driven gear 282 is connected to the feed roller 46a of the fourth one-way roll feeder 46 and is rotated in meshing engagement with the second intermediate gear 280. The second one-way clutch bearing 284 is fitted to the second driven gear 282 so that the torque of the second driven gear 282 can be transmitted to the feed roller 46a of the fourth one-way roll feeder 46 when the motor 252 is rotated clockwise. In contrast, if the motor 252 is rotated counterclockwise, the second one-way clutch bearing 284 prevents the torque of the second driven gear 282 from being transmitted to the feed roller 46a of the fourth one-way roll feeder 46. Consequently, the second driven gear 282 comes into an idling state.

Such an operation of the motor 252, the first gear mechanism 260, the second gear mechanism 270 and the belt transmission mechanism 290 ensures that the medium 2 smoothly loaded or unloaded when the motor 252 is rotated clockwise or counterclockwise. With the driving device 250 of this example, the first and second one-way clutch bearings 278 and 284 enables the medium 2 to be conveyed along the circuit line 22 of the track 16 regardless of the rotating direction of the motor 252.

With the present double side image scanner described herein above, it is possible to accurately obtain images from the front and rear surfaces of a medium by use of a single image sensor. Furthermore, owing to the use of a single motor and a single image sensor, the present double side image scanner is structurally simple and easy to fabricate, which leads to increased productivity and reduced production costs.

While a preferred embodiment of the present invention has been described hereinabove, the present invention is not limited thereto. It will be understood by those skilled in the art that various changes and modifications may be made without departing from the scope of the invention defined in the claims.

What is claimed is:

1. A double side image scanner comprising:
    a frame having a first and second major surfaces, the frame including a track for guiding a medium having a front surface, a rear surface, a leading end and a trailing end, the track including an entrance through which the medium is loaded and unloaded, a scanning line joined to the entrance so that the medium is scanned in the scanning line and a circuit line joined to the scanning line, the circuit line designed to return the medium to the scanning line, the circuit line having a junction point where the circuit line meets with the scanning line, an inlet through which the medium comes into the circuit line from the scanning line and an outlet through which the medium goes out of the circuit line toward the scanning line;
    at least one two-way roll feeder mounted to the first major surface of the frame for conveying the medium along the scanning line in a medium-loading direction and in a medium-unloading direction;
    at least one one-way roll feeder mounted to the first major surface of the frame for conveying the medium along the circuit line in the medium-loading direction;
    a driving means mounted to the frame for driving the two-way roll feeder and the one-way roll feeder; and
    an image sensor mounted to the first major surface of the frame along the scanning line for obtaining image data by scanning one of the front surface and the rear surface of the medium when the medium is loaded along the scanning line and by scanning the remaining one of the front surface and the rear surface of the medium when the medium is unloaded along the scanning line.

2. The double side image scanner as recited in claim 1, wherein the driving means comprises:
    a motor mounted to the frame and rotated in one of first and second rotating directions;
    a first gear mechanism arranged between the two-way roll feeder and the motor for transmitting a driving power of the motor to the two-way roll feeder in a direction opposite to one of the first and second rotating directions of the motor; and
    a second gear mechanism arranged between the one-way roll feeder and the first gear mechanism for transmitting the driving power of the motor to the one-way roll feeder, the second gear mechanism designed to interlock with the first gear mechanism to ensure that the two-way roll feeder and the one-way roll feeder are rotated in the same direction when the medium is loaded along the scanning line but the two-way roll feeder and the one-way roll feeder are rotated in the opposite directions each other when the medium is unloaded along the scanning line.

3. The double side image scanner as recited in claim 2, wherein the first gear mechanism comprises:
    a first driving gear operatively connected to the motor and rotated by the driving power of the motor;
    a first intermediate gear attached to the second major surface of the frame for rotation in meshing engagement with the first driving gear;
    a second intermediate gear operatively connected to the first intermediate gear for unitary rotation with the first intermediate gear;
    a third intermediate gear attached to the second major surface of the frame for rotation in meshing engagement with the second intermediate gear; and
    a first driven gear attached for rotation in meshing engagement with the third intermediate gear and operatively connected to the two-way roll feeder.

4. The double side image scanner as recited in claim 3, wherein the one-way roll feeder includes a plurality of one-way roll feeders arranged along the circuit line and wherein the second gear mechanism comprises:
    a fourth intermediate gear rotatably attached to the second surface of the frame;
    a second driven gear operatively connected to one of the plurality of one-way roll feeders and rotated in meshing engagement with the fourth intermediate gear;
    a clutch gear attached for rotation in meshing engagement with the second intermediate gear, the clutch gear designed to make planetary movement around the second intermediate gear in such a manner as to selectively engage with one of the fourth intermediate gear and the second driven gear; and a clutch lever designed to interconnect the fourth intermediate gear and the clutch gear in such a manner as to restrain the clutch gear position relative to the second intermediate gear.

5. The double side image scanner as recited in claim 4, wherein the second gear mechanism further comprises a restraint member arranged on the second major surface of the frame for restraining the planetary movement of the clutch gear relative to the second intermediate gear, the restraint member having a slot with first and second end surfaces, the clutch gear having a shaft inserted into the slot of the restraint member, the clutch gear designed to engage with the second intermediate gear and the second driven gear and to disengage from the fourth intermediate gear when the shaft makes contact with the first end surface of the slot, the clutch gear also designed to engage with the second intermediate gear and the fourth intermediate gear and to disengage from the second driven gear when the shaft makes contact with the second end surface of the slot.

6. The double side image scanner as recited in claim 4, wherein the plurality of one-way roll feeders is operatively connected and simultaneously driven by a belt transmission mechanism.

7. The double side image scanner as recited in claim 3, wherein the one-way roll feeder includes a plurality of one-way roll feeders arranged along the circuit line, the plurality of one-way roll feeders operatively connected and simultaneously driven by a belt transmission mechanism, and wherein the second gear mechanism comprises:

a second driving gear attached to the second major surface of the frame for rotation in meshing engagement with one of the first and second intermediate gears of the first gear mechanism;

a fourth intermediate gear operatively connected to the second driving gear for unitary rotation with the second driving gear;

a second driven gear operatively connected to one of the plurality of one-way roll feeders and rotated in meshing engagement with the fourth intermediate gear;

a first one-way clutch bearing attached to the second driven gear, the first one-way clutch bearing designed to allow the torque of the second driven gear to be transmitted to one of the plurality of one-way roll feeders when the motor is rotated counterclockwise but to prevent the torque of the second driven gear from being transmitted to one of the plurality of one-way roll feeders when the motor is rotated clockwise;

a fifth intermediate gear attached to the second major surface of the frame for rotation in meshing engagement with the second driving gear;

a third driven gear operatively connected to one of the plurality of one-way roll feeders and rotated in meshing engagement with the fifth intermediate gear; and a second one-way clutch bearing attached to the third driven gear, the second one-way clutch bearing designed to allow the torque of the third driven gear to be transmitted to one of the plurality of one-way roll feeders when the motor is rotated clockwise but to prevent the torque of the third driven gear from being transmitted to one of the plurality of one-way roll feeders when the motor is rotated counterclockwise.

8. The double side image scanner as recited in claim 1, wherein the two-way roll feeder includes a plurality of two-way roll feeders arranged along the scanning line, and further comprising a control means for controlling the driving means and the image sensor, the control means comprising:

a first sensor arranged downstream of the foremost one of the plurality of two-way roll feeders positioned near the entrance, the first sensor designed to detect the leading end of the medium passing through the foremost one of the plurality of two-way roll feeders to generate a signal;

a second sensor arranged upstream of the image sensor for detecting the leading end of the medium moved toward the image sensor in a loading process to generate a signal;

a third sensor arranged downstream of the image sensor for detecting the leading end of the medium moved toward the image sensor in an unloading process to generate a signal;

a fourth sensor arranged between the outlet of the circuit line and the last one of the plurality of one-way roll feeders positioned near the junction point, the fourth sensor designed to detect the leading end of the medium to generate a signal; and a microcontroller connected to the image sensor, the driving means and the first to fourth sensors for rotating the motor in the medium-loading direction in response to the signal of the first sensor, for rotating the motor in the medium-unloading direction in response to the signal of the fourth sensor and for operating the image sensor in response to the signals of the second and third sensors.

* * * * *